INVENTOR.
ROBERT P. FARNSWORTH,
BY Walter J. Adam
ATTORNEY.

United States Patent Office 3,173,078
Patented Mar. 9, 1965

3,173,078
OVERLOAD PROTECTIVE POWER SUPPLY
Robert P. Farnsworth, Los Angeles, Calif., assignor to Hughes Aircraft Company, Culver City, Calif., a corporation of Delaware
Filed Dec. 1, 1960, Ser. No. 72,971
7 Claims. (Cl. 323—9)

This invention relates to power supplies and particularly to a direct-current power supply including a simplified and precise overload sensing circuit.

In semiconductor circuitry, power supplies may be required to have a relatively low output impedance which during a short circuit or accidental overload condition allows a large current to flow through the supply. This excessive short circuit current may cause destruction in a very short time of the transistors and rectifiers of the power supply as well as destruction of the transistor circuitry being supplied with power. Thus, a turn off or disconnect circuit is required in the power supply that operates with a fast response time to prevent damage to the overloaded circuitry. Also, the turn off circuit for satisfactory operation should automatically reconnect the power at the termination of the overload condition.

Conventional electronic overload protection circuits may include a limited current drive arrangement coupled to the regulating transistor for limiting the maximum load current. The value of maximum load current is the product of the drive current times the $\beta$ of the regulating transistor. Thus, this overload protection arrangement relies on the amplification factor $\beta$ of the transistors to determine the load current at which the disconnecting operation occurs. Because the amplification factor varies with temperature and aging, the overload current varies greatly to prevent precise and accurate overload protection. Also, conventional electronic turn off circuits are relatively slow operating because of the inherent delay in serially switching a plurality of transistors.

It is therefore an object of this invention to provide a power supply including a simplified and fast acting overload protection circuit.

It is a further object of this invention to provide a semiconductor power supply directly responsive to the load current to disconnect the source of power upon occurrence of an overload condition and to automatically connect the power upon termination of the overload condition.

It is a still further object of this invention to provide a trigger type overload protection circuit for a power supply that utilizes a tunnel diode so as to respond to overload or short circuit conditions with a minimum of delay time.

It is another object of this invention is provide an overload protection circuit for a power supply utilizing a tunnel diode so as to respond with a high degree of tolerance to a selected maximum load current.

According to one feature of this invention, a power supply is provided with a series regulating element coupled in a load current path and controlled through an amplifier from a voltage comparator. A reference circuit and a sensing circuit in the voltage comparator develop signals for controlling the amplifier. A current sensing arrangement is provided including a tunnel diode coupled in the load current path and a transistor with the base and emitter thereof coupled across the tunnel diode and the collector arranged to control the amplifier. The tunnel diode and transistor combination has a combined operating characteristic that triggers the transistor into conduction in response to a peak load current to bias the regulating element out of conduction. As the load current is reduced, the current sensing arrangement responds to a valley current to again render the regulating element operative so as to return the power supply to regulation until another overload condition is sensed.

The novel features of this invention, as well as the invention itself, both as to its organization and method of operation, will best be understood from the accompanying description, taken in connection with the accompanying drawings, in which.

Figure 1:
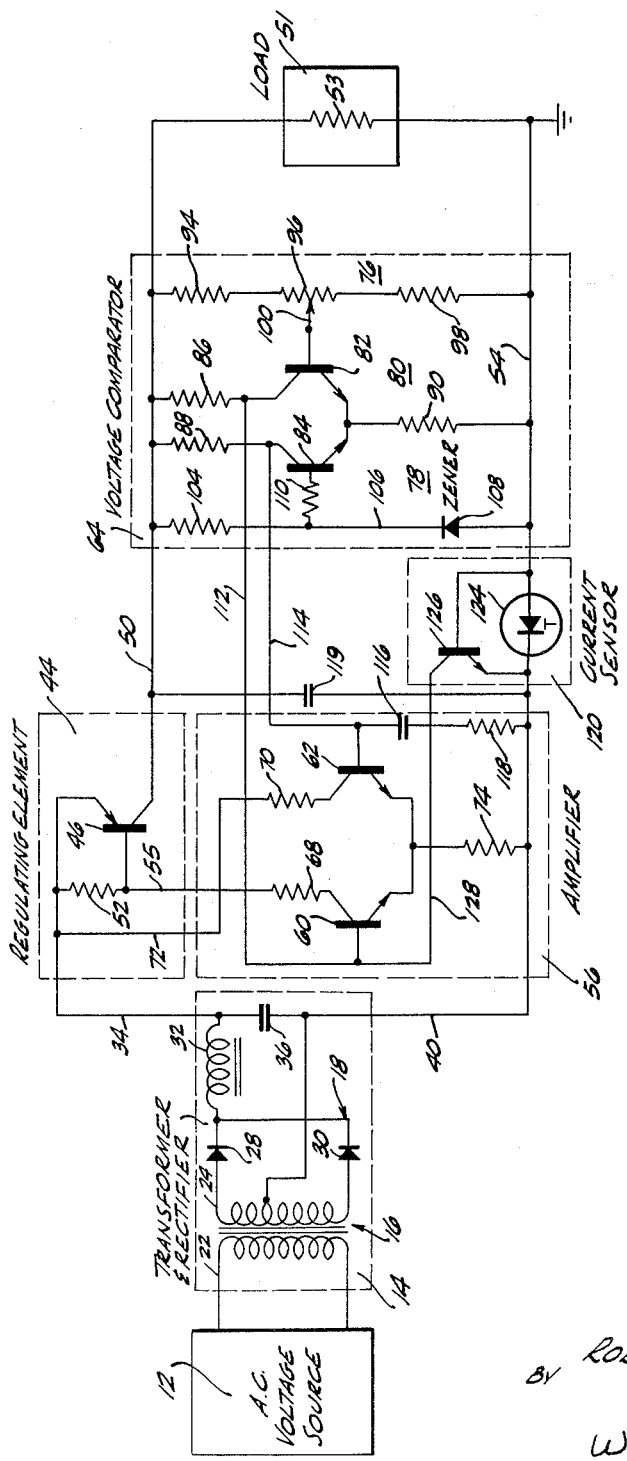
FIG. 1 is a schematic circuit diagram of an overload protective power supply in accordance with this invention.

Referring first to FIG. 1 for explaining the arrangement of the elements in the power supply in accordance with this invention, an A.C. (alternating current) voltage source 12 applies power to a circuit 14 including a transformer 16 and a half wave rectifier 18. The transformer 16 includes a first winding 22 coupled to the source 12 and a second inductively coupled winding 24 having opposite ends coupled through diodes 28 and 30 to one end of an inductor 32. The other end of the inductor 32 is coupled to a first input lead 34 as well as through a capacitor 36 to a second input lead 40 coupled from a tap on the winding 24. The inductor 32 and capacitor 36 provide filtering to substantially remove the ripple from the rectified D.C. (direct current) signal.

A series regulating element 44 includes a transistor 46 of the p-n-p type having an emitter coupled to the input lead 34 and a collector coupled to a regulated lead 50. The base of the transistor 46 is coupled through a leakage resistor 52 to the input lead 34 and through a lead 55 to an amplifier circuit 56. The lead 50 is coupled to a load 51 which may include a resistor 53 coupled at the other end to a level of reference potential such as ground. Thus, a load current path is formed from ground through a lead 54 and a current sensor circuit 120, through the lead 40 and the winding 24, through the regulating element 44 and through the lead 50 and the load 51 to ground.

A first transistor 60 and a second transistor 62, both of the n-p-n type, form a differential amplifier circuit in the amplifier circuit 56 for responding to the signals developed by a voltage comparator 64. The transistor 60 has a collector coupled through a current limiting resistor 68 to the lead 55 for controlling the regulating transistor 46. The collector of the transistor 62 is coupled to a current limiting resistor 70 which in turn is coupled through a lead 72 to a convenient level of potential such as the lead 34. In order that the transistor 62 operates as an emitter follower for controlling the transistor 60, the emitters of the transistors 60 and 62 are both coupled through a common resistor 74 to the second input lead 40.

The voltage comparator circuit 64 which during normal regulatory operation controls the amplifier 56 includes a sensing circuit 76, a reference circuit 78 and a differential amplifier 80 for comparing a reference potential with a sensed potential. The differential amplifier 80 includes a first transistor 82 and a second transistor 84 both of the n-p-n type. The collector of the transistor 82 is coupled to the regulated lead 50 through a current limiting resistor 86, the collector of the transistor 84 is coupled to the lead 50 through a current limiting resistor 88 and the emitters of the transistors 82 and 84 are both coupled through a common resistor 90 to the lead 54.

The voltage sensing circuit 76 includes resistors 94, 96 and 98 coupled respectively in series between the regulated lead 50 and the lead 54 with a movable tap 100 coupled between the resistor 96 and the base of the transistor 82. The reference circuit 78 includes a dropping resistor 104 having one end coupled to the lead 50 and the other end coupled through a lead 106 to the cathode of a Zener diode 108 for providing a relatively constant voltage drop, the anode of which is coupled to the lead 54. The base of the transistor 84 is controlled by the reference potential on the lead 106 through a resistor 110 provided for matching the impedance of voltage divider 76.

For controlling the amplifier 56 the collector of the transistor 82 is coupled through a lead 112 to the base of the transistor 60 and the collector of the transistor 84 is coupled through a lead 114 to the base of the transistor 62. The lead 114 is also coupled from the base of the transistor 62 through a frequency compensating arrangement including series coupled capacitor 116 and resistor 118 to the second input lead 40, the capacitor 116 maintaining the gain for low frequency signal components and the resistor 118 limiting the attenuation for high frequency signal components. In order to overcome high frequency variations on the regulated lead 50 such as resulting from load variation, a bypass capacitor 119 is coupled between the regulated lead 50 and the second input lead 40.

To provide the overload protection operation of the circuit in accordance with this invention, the current sensor 120 is provided including a negative resistance device such as a tunnel diode 124 coupled in the load current path such as with the anode coupled to the lead 54 and the cathode coupled to the lead 40. Also included in the current sensor 120 is a switching device such as a transistor 126 which may be of the n-p-n type having the base and emitter coupled respectively across the tunnel diode 124 between the leads 54 and 40. For controlling the amplifier 56 to disconnect the load current during an overload condition, the collector of the transistor 126 is coupled through a lead 128 to the base of the transistor 60.

During normal regulating action the transistor 46 functions as a linear amplifier for maintaining a desired positive potential relative to ground on the regulated lead 50. It is to be noted that by grounding the lead 50 instead of the lead 54 the circuit of FIG. 1 operates to supply on the lead 54 a negative potential relative to ground. In response to an increase of potential on the lead 50, such as from source variations or load variations, an increase of potential is impressed on the base of the transistor 82 to increase conduction thereof and develop a decrease of potential on the collector thereof. At the same time the increased conduction through the transistor 82 and through the common resistor 90 increases the potential at the emitter of the transistor 84 to decrease conduction therethrough and provide an increase of potential on the collector thereof. The increase of potential on the lead 114 is applied to the base of the transistor 62 to increase conduction thereof which in turn results in an increase of potential at the emitter of the transistor 60 to decrease conduction thereof. At the same time, the decrease of potential on the lead 112 is applied to the base of the transistor 60 to further decrease conduction thereof so that the amplifier 56 is highly responsive to voltage changes on the lead 50. The decrease in conduction of the transistor 60 results in an increase of the potential applied to the base of the regulating transistor 46 so as to lower the conductance of the regulating transistor 46 and as a result, decrease the potential at the load 51. Thus, the potential on the lead 50 is instantaneously returned to the regulated value. It is to be noted that in response to a decrease of potential on the lead 50, the circuit responds in a similar but opposite manner to that discussed above, to increase conductance of the regulating transistor 46 and provide a compensating increase of potential on the lead 50.

Figure 2:
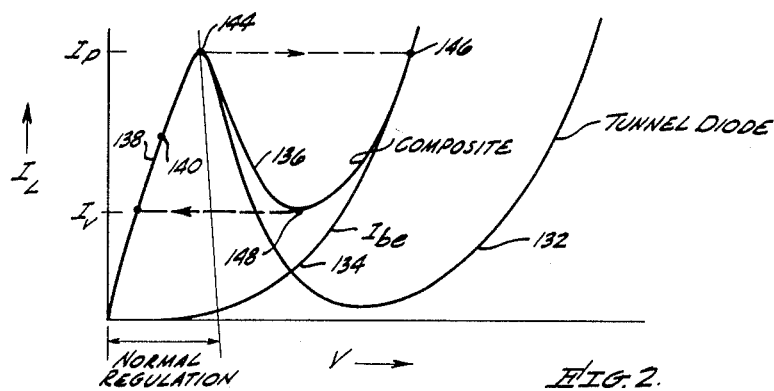
FIG. 2 is a graph of load current versus voltage for explaining the operation of the current sensing circuit in the power supply of FIG. 1.

For explaining the overload protection operation of the circuit of FIG. 1, the graph of FIG. 2 includes a curve 132 which is the characteristic current versus voltage operating characteristic of the tunnel diode 124. A curve 134 represents the characteristic variation of base-to-emitter current $I_{be}$ versus base-to-emitter voltage for the transistor 126. Combining the operating characteristics of curves 132 and 134 relative to the base of the transistor 126 provides a composite characteristic curve 136 for defining the operation of the current sensor 120.

When current is supplied to the load 51 during normal regulation the operating point of the overload circuit 120 is along a line 138 of the composite curve 136, which curve in that region is similar to the tunnel diode curve 132 because of the substantially zero base-to-emitter current of the transistor 126 in that region. The normal operating point for one current requirement of the load 51, for example, may be at a point 140. It is to be noted that the voltage drop across the tunnel diode 124 is relatively small during normal regulation. When regulating such as at the point 140, the transistor 126 is maintained in a nonconductive condition because the low voltage drop across the tunnel diode 124 may be approximately 55 millivolts while .4 to .5 volt of forward bias is required to bias the transistor 126 into conduction.

During an overload condition such as a short circuit or change of current requirement of the load 51, the load current $I_L$, which current passes from ground through the tunnel diode 124 and through the transformer 16 and transistor 46 to the load 51, increases along the line 138 to the peak current $I_P$ of the composite curve 136, which curve is similar to the tunnel diode curve 132 as discussed above. At a peak point 144 which is the selected maximum load current $I_P$, the operating characteristic of the current sensor 120 changes rapidly to the right through the negative resistance region to a high voltage condition at a point 146 on the composite curve 136. It is to be noted that the transistor 126 changes state with a trigger type action because of the negative resistance region of the composite curve 136. The base-to-emitter voltage across the transistor 126 developed across the tunnel diode 124 when the circuit 120 is operating at the point 146 biases the transistor 126 into saturated collector to emitter conduction so as to impress a potential substantially at ground through the lead 128 to the base of the transistor 60. Thus, the potential at the base of the transistor 60 is substantially lower than the potential at the emitter thereof and the transistor 60 is rapidly switched out of conduction. Accordingly, the potential at the base of the regulating transistor 46 increases to substantially the same potential as on the lead 34 and on the emitter of the transistor 46, so the transistor 46 is rapidly switched out of conduction to effectively disconnect to lead 34 from the regulated lead 50. Thus, current is prevented from flowing through the load 51 and the voltage level on the lead 50 rapidly falls.

As the load current $I_L$ decreases toward zero, the operating point of the circuit 120 moves down from the point 146 to a point 148 which is at the valley point of the composite curve 136 at a valley current $I_V$. Thus, because the sum of the incremental rates of change of current with respect to voltage, resulting from the nonlinear impedance of the tunnel diode 124 and base-to-emitter characteristic of the transistor 126, equals zero and becomes negative the tunnel diode 124 changes state and the circuit 120 operating point is triggered back to a point on the line 138. It is to be noted that the tunnel diode 124 characteristically remains stable in the conductive state as long as the incremental rate of change of current on the lead 54 is negative with negative incremental voltage change such as operating along the curve 136 between the points 146 and 148.

When the circuit 120 changes state by triggering to a point such as 140 on the line 138, the voltage drop across the tunnel diode 124, which is at the low voltage state, is again insufficient to maintain the transistor 126 forward biased so the transistor 126 is simultaneously triggered to a nonconductive state. Thus, the transistor 60 is again rendered conductive and in turn the regulating transistor 46 is biased to the amplification region and normal regulation continues until another overload condition is sensed by the circuit 120.

Figure 3:
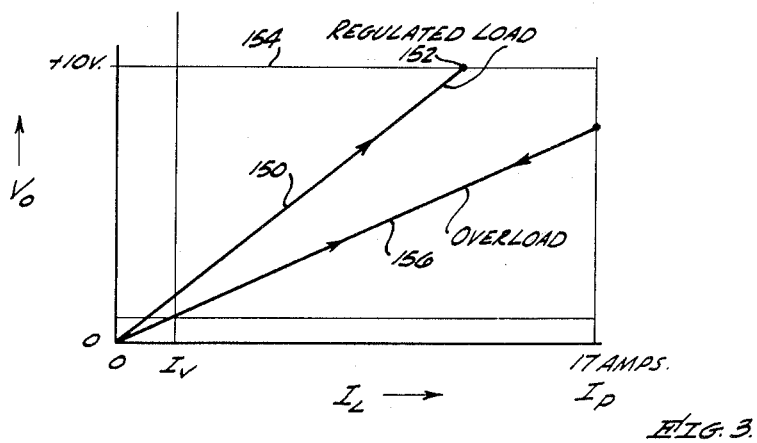
FIG. 3 is a graph of output voltage versus load current for explaining the operating characteristics of the power supply of FIG. 1.

Referring now to FIG. 3 which shows a graph of output voltage $V_o$ versus load current $I_L$, a path 150 shows the increase of load current during start up to regulated voltage which may be $+10$ volts when the load 51 is requiring less than the selected maximum load current $I_P$. Thus, the power supply operates at a point 152 or along a line 154 at the regulated voltage as the load current varies below the selected maximum load $I_P$. However, when the load current tends to exceed the maximum current $I_P$, the power supply operates along an overload line 156, first decreasing in load current to $I_V$ and then increasing in load current to $I_P$, which repetitive operation continues cyclically during the presence of an overload condition. The selected peak current $I_P$ may, for example, be 17 amperes. Thus, during a continuous overload such as a short circuit the power supply continually changes state between a selected maximum current $I_P$ at some voltage below the regulated voltage of $+10$ volts, and the valley current $I_V$. When the overload condition is removed, the cyclical operation terminates with the transistor 126 biased out of conduction and the circuit 120 returns to continual regulatory operation along the line 138 of FIG. 2. Normal regulation continues at a point such as 152 of FIG. 3.

Figure 4:
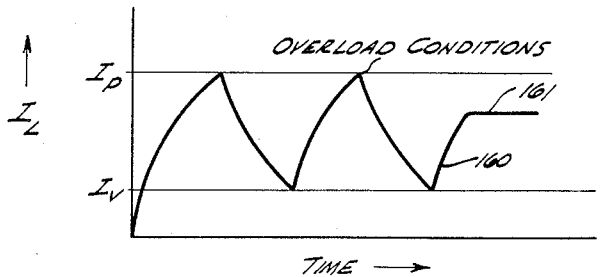
FIG. 4 is a graph of load current versus time for explaining the cyclical disconnecting and returning to normal regulation of the power supply of FIG. 1 during the occurrence of a continuous overload condition.

Referring now to FIG. 4 as well as to FIG. 1, a curve 160 shows the rise and fall of the load current versus time during a continuous overload condition. The curve 160 may have a nonlinear shape because of the charging and discharging time of the bypass capacitor 119 and because of storage of the inductor 32. It is to be again noted that the system continues to fluctuate between load currents $I_P$ and $I_V$ at a rapid rate, continually being restored to regulation until the overload condition is removed at which time normal regulation continues such as at a current level 161 until another overload condition occurs.

Because the current sensor 120 responds directly to the load current flowing through tunnel diode 124 without depending on an amplification charateristic of any transistor and because the tunnel diode 124 is highly stable to temperature changes and varies little in characteristics as a result of aging, the circuit in accordance with this invention provides highly precise overload current sensing. The transistor 126 operates as a switch to apply a disconnecting signal to the base of the transistor 60 so that the overload operation is relatively independent of changes of $\beta$ of the transistors such as 126, 60 and 46. Peak current values for the tunnel diode may be selected with an accuracy of $\pm 1\%$ and the maximum overload current point may be defined with similar accuracy. Also, the overload protection operation in accordance with this invention provides a rapid response to an overload condition because of the trigger action of the current sensor 120.

It is to be recognized that the overload sensor circuit 120 in accordance with this invention is not limited to the position shown in the load current path of FIG. 1, but that the sensor circuit may be utilized with the tunnel diode 124 in other locations in the load current path within the principles of this invention. Also, the transistor types used in the power supply of FIG. 1 are given for example only, and other type transistors may be utilized in accordance with this invention by reversing the circuit polarity arrangements. Further, the power supply has been explained for developing a positive regulated voltage relative to ground but the circuit of FIG. 1 may develop a negative voltage by grounding the lead 50 instead of the lead 54. It is also to be noted that the overload protection arrangement in accordance with this invention may be utilized in other types of power supply circuits such as switching type supplies and in supplies including vacuum tube components.

Thus, there has been described a simplified power supply that includes a highly accurate and reliable current sensing overload protection circuit that both disconnects and restores the power during an overload such as a short circuit. Because the current sensing circuit functions with a trigger type operation, the circuit responds rapidly to prevent damage to the power supply or the load to which power is supplied.

What is claimed is:

1. In a power supply having a load current path, regulating means coupled in the load current path and control means coupled to said load current path and to said regulating means and being capable of rendering said regulating means nonconductive in response to a disconnect signal, an overload sensing circuit comprising a tunnel diode coupled in the load current path, and a transistor having a base and a first electrode coupled across said tunnel diode and having a second electrode coupled to said control means for applying the disconnect signal thereto when the current in said load current path increases to a predetermined value and for terminating said disconnect signal when the current decreases in said load path in response to said regulating means being rendered nonconductive.

2. A circuit for supplying power to a load comprising a source of rectified voltage, a regulating element coupled between said source and said load, a voltage comparator coupled across said load, amplifying means coupled between said voltage comparator and said regulating element, a tunnel diode coupled between said source and said load, and a transistor having a base and emitter coupled across said tunnel diode and a collector coupled to said amplifying means for controlling said regulating element during an overload condition to disconnect said source of rectified voltage from said load.

3. A circuit for limiting the current supplied to a load to a predetermined maximum value in a power supply having a load current path for supplying a regulated voltage to a load and having a regulating element coupled in the load current path, comprising first means coupled across said load for responding to the potential thereat, second means coupled to said first means and to said regulating element for developing a control signal to provide regulation of voltage at said load, said second means being responsive to a disconnect signal to bias said regulating element to a nonconductive state, a tunnel diode coupled in said load current path, and a transistor having a base and an emitter coupled across said tunnel diode and a collector coupled to said second means for applying said disconnect signal thereto when the current in said load current path increases to the maximum value and for removing said disconnect signal when said load current decreases to a predetermined lower value as said regulating element is biased out of conduction.

4. An overload protection circuit in a power supply having a source of power coupled to a load through a regulating element, voltage comparator means coupled across the load, amplifier means coupled between the voltage comparator means and a control terminal of the regulating element, said voltage comparator means and amplifier means controlling the regulating element to provide regulation of the voltage across the load, said amplifier means having a terminal for responding to a disconnect signal to switch the regulating element out of conduction, said overload protection circuit comprising a tunnel diode having an anode and cathode coupled in the load current path, and a transistor having a base and emitter coupled respectively to the anode and cathode of said tunnel diode and a collector coupled to said terminal of said amplifier means for applying a disconnect signal thereto when the load current exceeds a predetermined maximum value.

5. A power supply comprising a load having first and second terminals; a source of rectified voltage having first and second supply leads; a regulating transistor having a base, having a first electrode coupled to said first supply lead and having a second electrode coupled to said first terminal of said load; voltage sensing means coupled across said load; reference voltage means coupled across said load; a first differential amplifier coupled across said load and between said voltage sensing means and said reference voltage means; a second differential amplifier coupled between said first and second supply leads, to said first differential amplifier and to the base of said regulating transistor; said second differential amplifier being capable of rendering said regulating transistor non conductive; a tunnel diode having an anode to cathode path coupled between said second terminal of said load and said second supply lead; and an n-p-n transistor having a base coupled to the anode of said tunnel diode, an emitter coupled to the cathode of said tunnel diode and a collector coupled to said second differential amplifier for rendering said regulating transistor non conductive in response to a predetermined maximum load current flowing through said tunnel diode.

6. A power supply comprising a source of rectified voltage having first and second output leads; a load having first and second terminals; a regulating element having a load current path coupled between the first output lead of said source of rectified voltage and said second terminal of said load and having a control terminal; a voltage comparator coupled between said first and second terminals of said load; amplifier means coupled between said voltage comparator and the control terminal of said regulating element for regulating the voltage at said load, said amplifier means being responsive to a disconnect signal to render said regulating element non conductive; a tunnel diode coupled between the first output lead of said source of rectified voltage and said first terminal of said load; a transistor having a base, an emitter and a collector with said base and emitter coupled across said tunnel diode and said collector coupled to said amplifier means, said tunnel diode maintaining said transistor non conductive during normal regulation and responding to a predetermined maximum load current to bias said transistor into conduction and apply said disconnect signal to said amplifier means.

7. A circuit for supplying a regulated voltage to a load from a source of power and during occurrence of an overload condition cyclically disconnecting and connecting the source of power from the load comprising a load current path coupled from a first terminal of said load through said source of power to a second terminal of said load, a regulating transistor having an emitter-collector path coupled in said load current path respectively between said source of power and the second terminal of said load and having a base, voltage sensing means coupled across said load, reference voltage means coupled across said load, a first transistor having a base coupled to said voltage sensing means and having a collector and an emitter, first impedance means coupled between the collector of said first transistor and the second terminal of said load, a second transistor having a base coupled to said reference voltage means and having a collector and an emitter, second impedance means coupled between the collector of said second transistor and the second terminal of said load, a first common resistor coupled between the emitters of said first and second transistors and the first terminal of said load, a third transistor having a base coupled to the collector of said second transistor and having a collector and an emitter, third impedance means coupled between the collector of said third transistor and the emitter of said regulating transistor, a fourth transistor having a base coupled to the collector of said first transistor and having a collector and an emitter, fourth impedance means coupled between the collector of said fourth transistor and the base of said regulating transistor, a second common resistor coupled between the emitters of said third and fourth transistors and said source of power, a tunnel diode having an anode to cathode path coupled in said load current path, and a fifth transistor having a base and emitter respectively coupled to the anode and cathode of said tunnel diode and having a collector coupled to the base of said fourth transistor, said fifth transistor applying a signal to said fourth transistor to cyclically bias said regulating transistor in and out of conduction in response to overload current flowing through said tunnel diode.

References Cited in the file of this patent
UNITED STATES PATENTS

| | | |
|---|---|---|
| 2,897,432 | Jackson | July 28, 1959 |
| 2,915,693 | Harrison | Dec. 1, 1959 |
| 2,963,637 | Osborn | Dec. 6, 1960 |
| 3,078,410 | Thomas | Feb. 19, 1963 |
| 3,089,998 | Reuther | May 14, 1963 |